United States Patent [19]

Wilkins et al.

[11] Patent Number: 5,013,004

[45] Date of Patent: May 7, 1991

[54] SUSPENSION PACK AND APPARATUS FOR PRODUCING SUSPENSION PACKS

[75] Inventors: Andre P. Wilkins, Private Road No.8, Colwick Industrial Estate, Nottingham NG4 2JX, England; Brian Lee, Carlton, United Kingdom

[73] Assignee: Andre Philip Wilkins, United Kingdom

[21] Appl. No.: 393,383

[22] Filed: Aug. 14, 1989

[30] Foreign Application Priority Data

Apr. 13, 1989 [GB] United Kingdom ................ 8908368

[51] Int. Cl.⁵ .................................... F16M 13/00

[52] U.S. Cl. .................................... 248/692; 24/616; 206/806; 211/113; 248/340

[58] Field of Search ............... 248/339, 340, 690, 691, 248/692; 24/616, 265, 297, 453; 211/113; 206/806, 284, 285, 286, 287

[56] References Cited

U.S. PATENT DOCUMENTS

| | | | |
|---|---|---|---|
| 3,310,272 | 3/1967 | Brunger | 211/113 X |
| 3,692,269 | 9/1972 | Hales | 248/691 |
| 3,815,182 | 6/1974 | Guard et al. | 24/453 |
| 3,862,687 | 1/1975 | Pirman | 211/113 X |
| 4,011,946 | 3/1977 | Savage et al. | 206/284 |
| 4,155,531 | 5/1979 | Bagne | 248/340 X |
| 4,266,677 | 5/1981 | Dewsnap | 211/113 X |
| 4,418,825 | 12/1983 | Mahowald | 248/692 X |
| 4,438,552 | 3/1984 | Omata | 24/297 X |
| 4,601,417 | 7/1986 | Kunreuther | 206/806 X |
| 4,739,543 | 4/1988 | Harris, Jr. | 24/297 |

FOREIGN PATENT DOCUMENTS

| | | | |
|---|---|---|---|
| 2451175 | 11/1980 | France | 24/616 |
| 381962 | 11/1964 | Switzerland | 248/340 |

*Primary Examiner*—David L. Talbott

*Attorney, Agent, or Firm*—Jones, Askew & Lunsford

[57] ABSTRACT

A suspension pack for supporting articles in point-of-sale advertising. The suspension pack includes a body folded to provide wall portions in face-to-face contact, and a suspension member extending through a slit in the fold. A base portion of the suspension member has at least one resilient tongue which engages the fold to resist withdrawal of the suspension member from the body.

11 Claims, 5 Drawing Sheets

Fig. 1
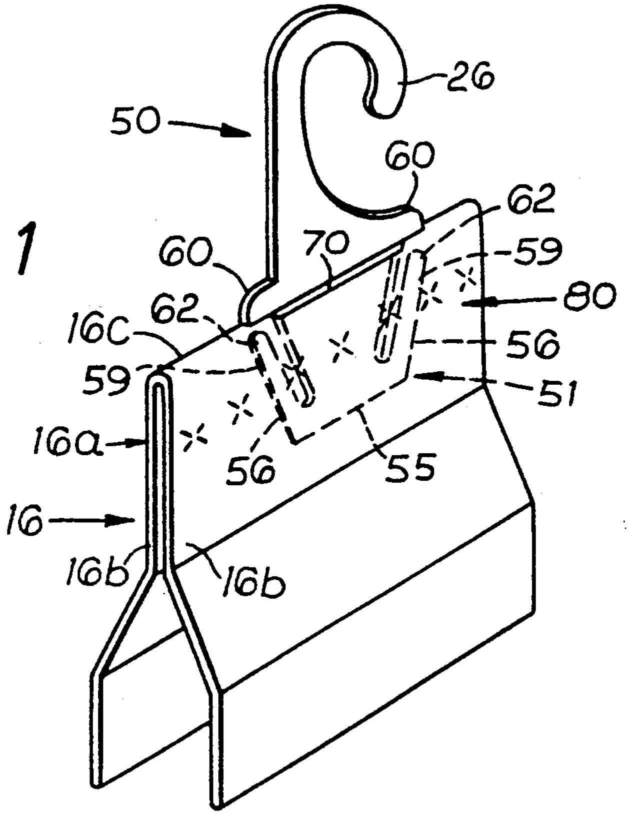
Fig. 2
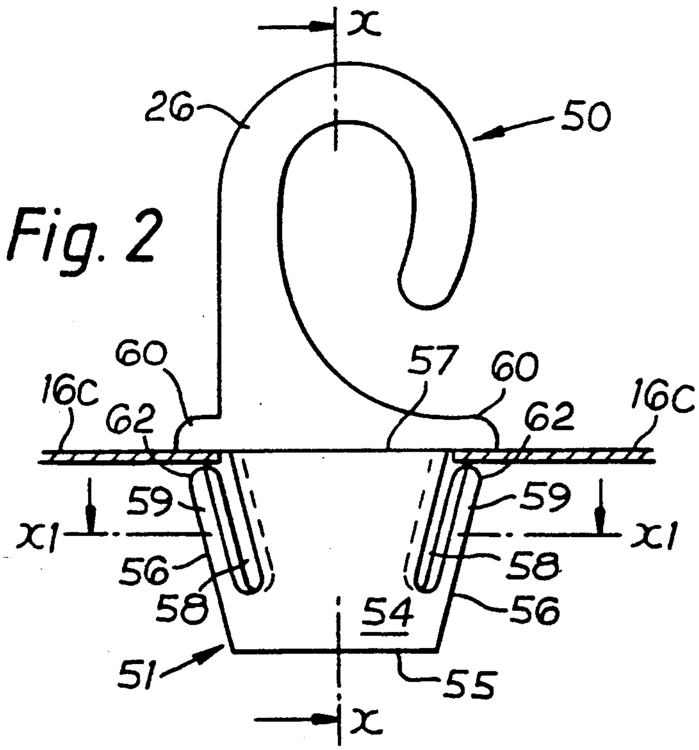
Fig. 3
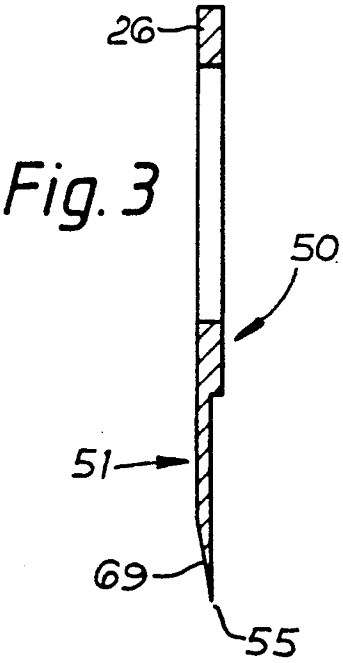
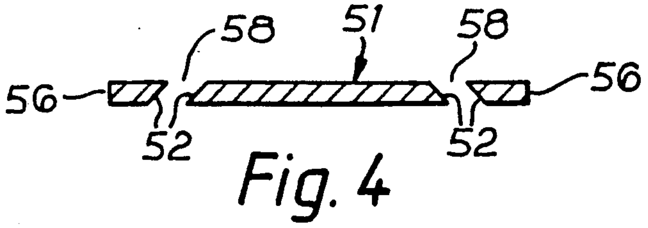
Fig. 4

SUSPENSION PACK AND APPARATUS FOR PRODUCING SUSPENSION PACKS

The present invention relates to suspension packs for articles and to an apparatus for producing suspension packs for articles, in particular suspension packs in the form of folded card to which is attached a suspension member.

According to one aspect of the present invention there is provided a pack for articles including a body formed from a stiff sheet of material adapted to contain or be attached to said articles, the body including a pair of folded wall portions held in face to face contact and joined by a fold, and a suspension member having a planar base portion and a suspension portion extending therefrom, the suspension member extending through a slit formed on or adjacent the fold so that the base portion is located adjacent the internal face of at lest one of said folded wall portions and so that the suspension portion extends externally of the folded wall portions to project beyond the fold, the base portion including a barb extending along at least one of its sides and toward the suspension portion and being arranged so that its terminal end engages beneath a marginal portion of the fold adjacent to said slit to resist withdrawal of the suspension member from said pair of folded wall portions.

According to another aspect of the present invention there is provided an apparatus for producing suspension packs for articles as defined above, the apparatus including pack body feed means for supplying, in an unfolded condition, individual pack bodies to a suspension member insertion station, folding means located at said insertion station for folding said folded wall portions about said fold line to an intermediate folded position in order to open said slit to define an aperture at an insertion position, suspension member feed means for supplying individual suspension members to said insertion station and for inserting the base portion of the suspension member through the aperture of the folded wall portions located at the insertion station, the folding means thereafter folding the wall portions to contact one another and discharging the pack from the insertion station.

Preferably the pack body feed means move individual pack bodies from a stack in a linear direction toward the insertion station and the suspension member feed means move individual suspension members from a stack in the opposite linear direction towards the insertion station.

Reference is now made to the accompanying drawings in which:

FIG. 1 is a schematic perspective view of a pack produced using an apparatus according to the present invention.

FIG. 2 is a side view of the hook member illustrated in FIG. 1.

FIG. 3 is a sectional view taken along line X—X in FIG. 2.

FIG. 4 is a sectional view taken along line XI—XI in FIG. 2.

Figure 5:
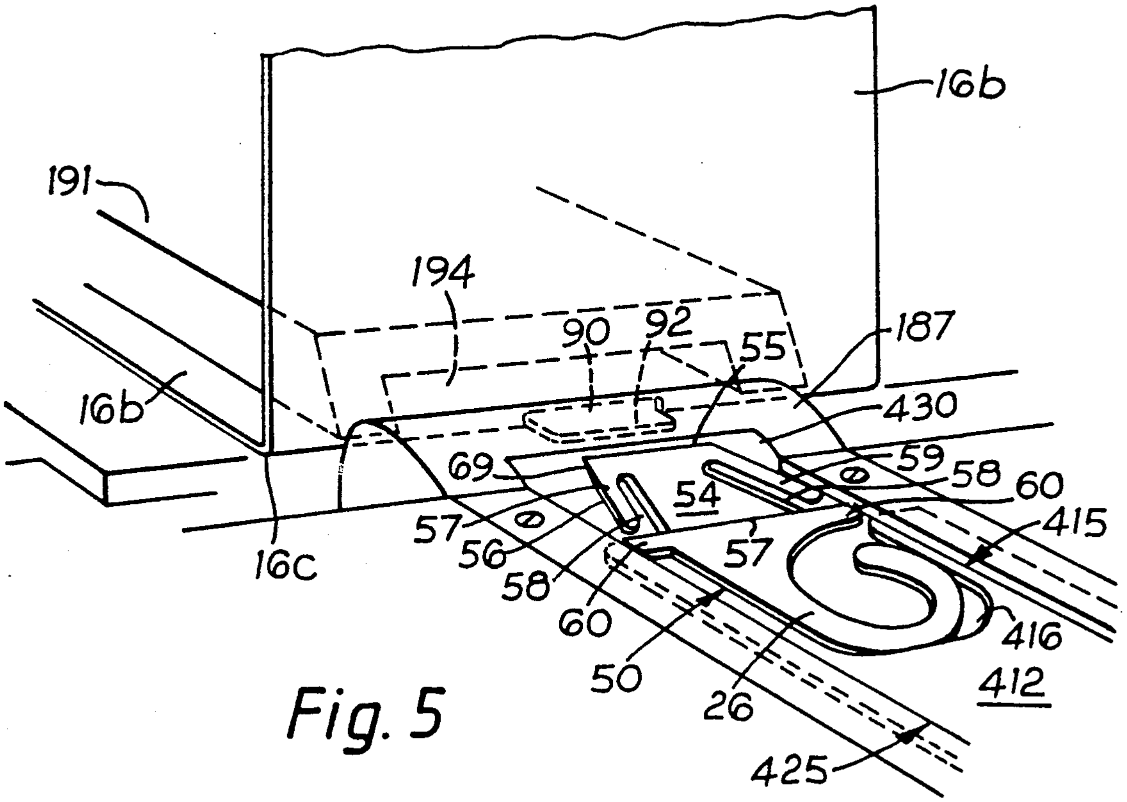
FIG. 5 is a schematic exploded perspective view of the suspension member of FIG. 1 shown being presented to the pack for insertion.

A pack according to the present invention is generally illustrated in FIG. 1 and includes a pack body 16 from which extends a hook member 50.

The hook member 50 is illustrated in FIGS. 1 to 4 and comprises a unitary plastics moulding having a planar base portion (51) from which extends a hook portion (26). The hook member 50 is generally planar and so a plurality of hook members 50 can be easily stacked vertically.

The base portion (51) includes a pair of sides (56) which taper towards one another towards bottom of the base portion (51). The bottom side (55) is therefore of a narrower dimension than the upper side (57) of the base portion.

A pair of slots (58) are provided which define a pair of barbs (59) extending along both sides of the base portion. The barbs (59) are formed so as to have an elongate body having a width dimension in excess of its thickness. Thus the body of the barb is relatively rigid to resist bending along its length. The slots (58) extend from the top of the base portion (51) and sufficiently close to the bottom of the base portion to provide a flexible and resilient connection between the barbs (59) and the central body portion (54) of the base portion (51).

The lower portion of the hook portion (26) is provided with a pair of shoulders (60) which overlie the upper terminal ends (62) of the barbs (59). The hook member (50) is shown in FIG. 1 attached to the raised central portion (**16*a*) of the pack (16). The raised central portion (16*a*) is formed by a pair of folded portions (16*b*) which are connected by a fold (16*c*) and arranged in face-to-face contact. A slit (70) is formed adjacent to the fold. The pack 16 illustrated in FIG. 1** is only an example and it will be appreciated that other shapes and sizes of packs may be utilised providing they contain a pair of folded wall portions connected by a fold.

In use the base portion (52) is presented to the slit (70) and is pushed through the slit (70). This is illustrated in FIG. 5.

The slit (70) has a length which approximates to the length of the bottom side (55) of the base portion (52) and accordingly as the bottom portion (52) is pushed into the slit (70) the barbs collapse inwardly towards one another.

Once the base portion (52) has been pushed into the slit such that the shoulders (60) bear against the marginal portion of the fold adjacent the slit (70) the terminal end (62) of the barbs clear the slit and are able to return to their original positions. Accordingly the terminal ends of the barbs then underlie the marginal portion of the fold in opposition to the shoulder (60). This is illustrated in FIGS. 1 and 2.

Accordingly when the hook member (50) is fully inserted into slit (70) the barbs (59) resist withdrawal of the hook member (50) from the slit and also the shoulders (60) prevent further insertion of the hook member through the slit. The width of the upper end of the central body portion (55) is approximately equal to the length of the slit (70). Thus movement of the suspension member along the slit is limited to ensure that the barbs contact the underneath of the fold.

To facilitate entry of the base portion (52) into the slit it is preferably provided with a chamfered bottom portion (69).

To facilitate collapse of the barbs (59) during insertion the opposed side of the slots (58) are defined by chamfered sides 52 (see FIG. 4).

Accordingly should the opposed sides 52 contact one another during collapse of the barb one side will ride over the other to deflect the barb and not therefore impede further collapse.

In the arrangement illustrated in FIG. 1 a line of glue (80) is preferably provided to permanently hold the folding portion (16*b*) in face-to-face contact. The line of glue (80) preferably passes across the base portion (52) and thereby provides additional securance of the hook member (50) to the card central portion (16*a*). Preferably the line of glue is defined by hot melt adhesive.

To facilitate entry of the base portion (52) into the slit (70), the slit is preferably offset from the fold line (16*d*) such that when the sides (16*b*) forming the central portion (16*a*) are located at approximately right angles as seen in FIG. 5, the slit (70) defines an aperture (90). This provides a wide opening for entry of the base portion and substantially reduces the accuracy of the positioning necessary for presenting successive hook members to successive cards in a mechanised system for insertion. In addition the portion of card between the slit and the fold line defines a protruding flap (92) which acts as a guide surface for guiding the base portion (52) into the aperture (90). Preferably the hook members are oriented such that the chamfered portion (69) faces the flap (92) and thereby facilitates entry.

Figure 12:
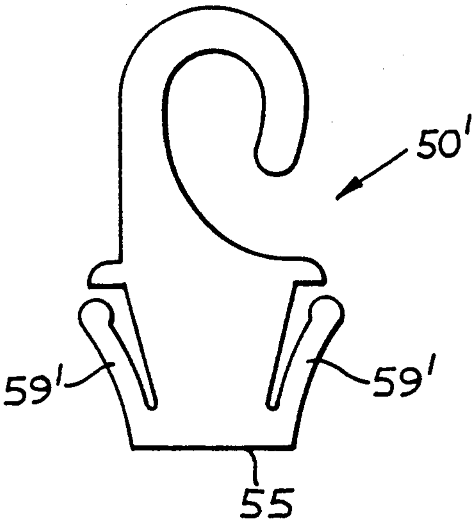
FIG. 12 is a side view of an alternative embodiment of the hook member.

An alternative construction of hook member 50' is illustrated in FIG. 12. The hook member 50' primarily differs from hook member 50 in that the shape of the barbs 59' are arcuate instead of linear. Accordingly barbs 59' bend outwardly from the bottom side 55 of the base portion and facilitates latching of the barbs 59' with he fold 16*c*.

Apparatus for inserting hook member (50) into packs (16) is illustrated in FIGS. 5 to 11.

Figure 6:
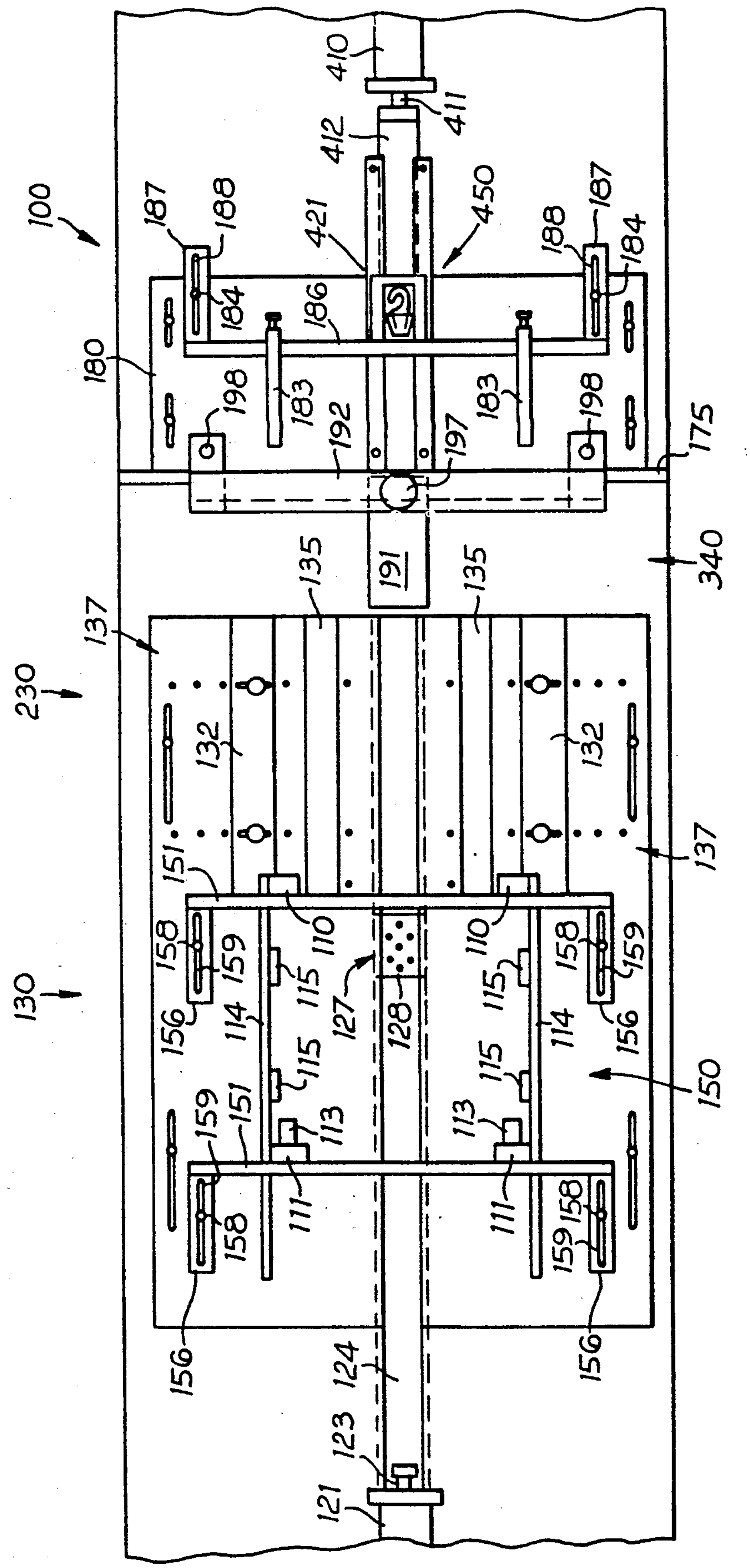
FIG. 6 is a schematic side view of an apparatus according to the present invention.
Figure 7:
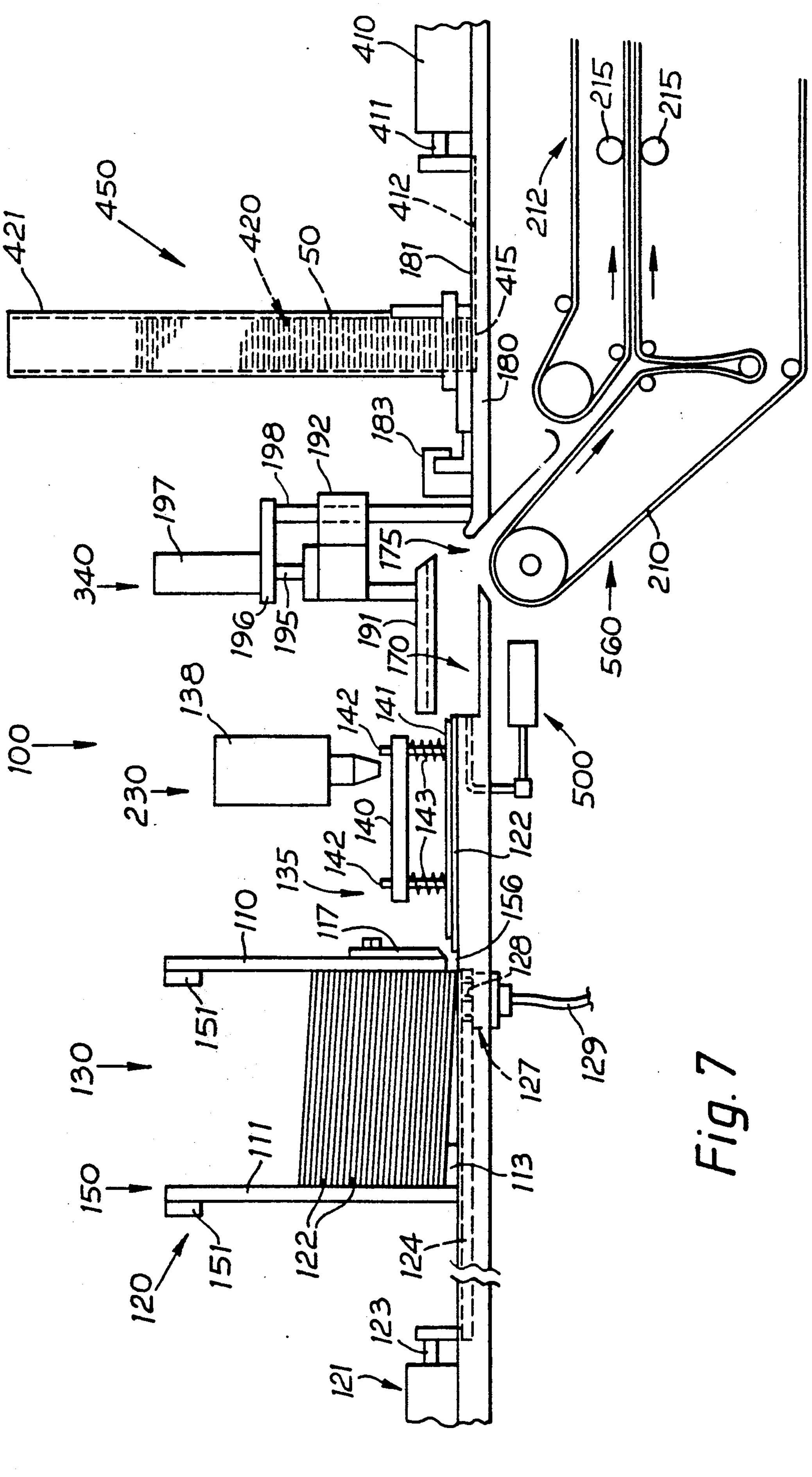
FIG. 7 is a schematic plan view of an apparatus according to the present invention.

In FIGS. 6 and 7 the apparatus is generally illustrated at 100 and includes a pack body feed means 120, a glue application station 230, a suspension member insertion station 340, a suspension member feed means 450 and a discharge conveying means 560.

The pack body feed means 120 includes a pneumatic piston and cylinder 121 having a piston rod 123 which is connected to a slide 124. The slide 124 is guided in a channel 125 formed in a first worktop 126. The slide 124 includes a feed head 127 which has gripping means in the form of suction ports 128 formed therein. Vaccuum is applied to the ports 128 via a pipe 129. In FIG. 6 the piston rod 123 is illustrated in its full retracted position and in this position the feed head 127 is located beneath a stack 130 of pack bodies 122.

Removal of the lowest pack body is achieved by applying vaccuum to the suction ports 128 in order that the feed head 127 grips the lowest pack body and then extending the piston rod 123 to its fully advanced position. The lowest pack body is then slid out from the bottom of the stack across the surface of the worktop 126 and in a direction toward the glue station 230. The previously removed body 122 located at the glue application station is engaged by the pack body being removed from the stack and is advanced thereby across the surface of worktop 126 to the suspension insertion station 340.

A pair of guide plates 132 are provided which engage the side edges of the body 122 and thereby guide movement of the bodies through the glue application station. Each plate 132 is adjustably secured to the worktop 126 via a pair of screws passing through slots formed in the plate. A plurality of pairs of threaded bores 137 are provided to enable the location of the screw to be varied.

If the body 122 is wide pressure feet 135 are preferably provided which resiliently engage the upper surface of the body 122 located at the glue application station in order to ensure that the pack body being removed from the stack is maintained in surface contact with the worktop 126 and reliably advances the pack body at the glue station 230 toward the insertion station 340.

Preferably a pair of pressure feet 135 are provided (shown schematically in FIG. 7), one being located either side of a hot melt glue application gun 138. Each foot 135 conveniently includes a support 140 to which a foot member 141 is slidingly attached via shafts 142. Springs 143 are provided between the support 140 and foot member 141 in order to bias the foot member 141 toward the worktop surface.

The stack 130 of pack bodies 122 is contained within a stack housing in the form of a framework 150. The framework 150 includes a pair of spaced cross-members 151 each of which is located at an elevated position relative to the worktop 126 and is supported on a pair of vertical posts (not shown) having feet 156 secured to the worktop 126 via bolts 158. The bolts 158 pass through slots 159 formed in the feet and thereby enable the position of the cross-member 151 to be adjusted. A pair of legs 110 are suspended from the leading cross-member to extend toward the worktop 126 and define a front support for the stack 130. Similarly a pair of legs 111 are suspended from the rear cross-member to extend toward the worktop 126 and define a rear support for the stack 130. Side plates 114 are secured to respective pairs of legs 110, 111 by means of bolts (not shown) passing through slots formed in the side plates 114. Upright posts 115 are secured to each side plate 114 and define side supports for the stack 130.

Preferably the rear legs 111 each carry wedge shaped feet members 113 on which the lowermost pack body 122 rests so as to incline the pack body toward an exit gap 156 located beneath each leg 110.

The inclination of the lowermost pack body in this way facilitates its removal from the stack.

The depth of the exit gap 156 may be adjusted by means of fingers 117 which are slidably and fixedly secured to each leg 110; such adjustment facilitates removal of a single pack body only when the feed head is advanced.

After piston rod 123 has been fully advanced, the pack body 122 just removed from the stack 130 will now be positioned at the glue application station 230 and the pack body previously located at the glue application station will now be positioned at the insertion station 340.

Vacuum applied to the feed head 127 is now discontinued and the piston rod 123 is retracted to its fully retracted position in order to locate the feed head 127 beneath the stack 130 in readiness for the next feed stroke.

Folding and insertion of a hook member into the pack body presented to the insertion station 340 may now begin. During this operation the gun 138 is operated to apply glue to the pack body located at the glue application station.

Figure 8:
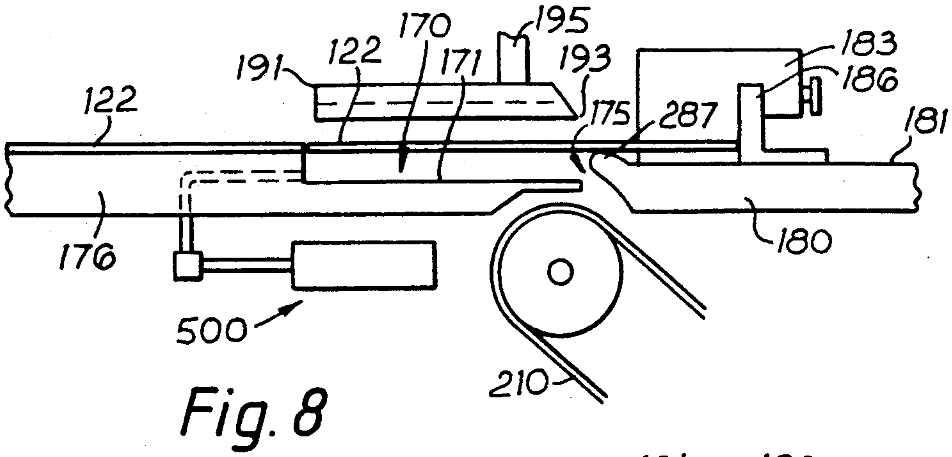
FIGS. 8 to 11 are schematic side views of the insertion station illustrating various stages of the folding/insertion process.
Figure 9:
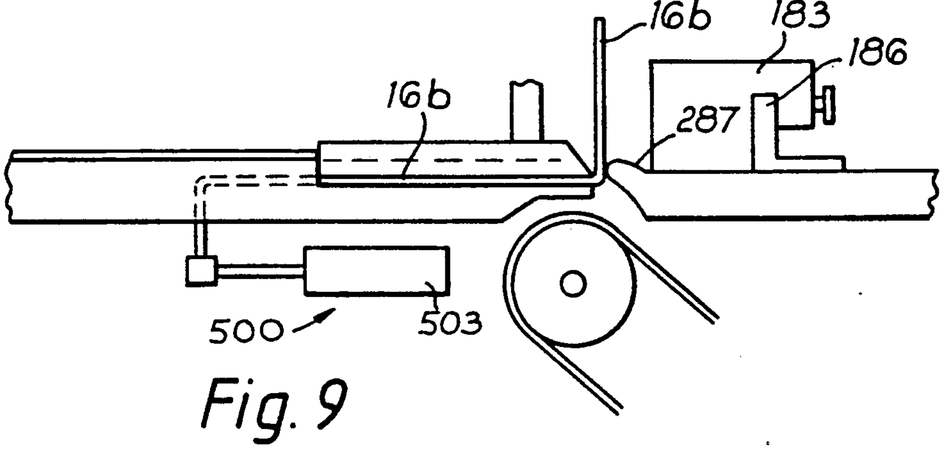

The presentation of a pack body 122 to the insertion station 340 is illustrated in FIG. 8.

The body 122 when initially located at the insertion station overlies a first support surface defined by the floor of a recess or well 170 formed in the worktop 126, a discharge gap 175 and a second support surface 180 formed on an adjacent second worktop 181. Location members 183, which in the illustrated embodiment are in the form of upstanding plate members 184 are adjustably secured to a cross-member 186 secured to the worktop 181. Location members 183 serve to positively locate and position the body 122 at the insertion station. A pair of plate members are used spaced either side of the periphery of the body so as to engage the sides of the body 122 as it is presented to the insertion station 340. The plate members are mounted on the cross-member 186 in an adjustable manner so that their position can be adjusted to accommodate different shapes and sizes of body 122. The cross-member 186 is secured to worktop 180 via feet 187 having slots 188 through which bolts 184 pass. The position of the cross-member 188 is therefore adjustable also.

The floor or base 171 of the well 170 is substantially at the same level as the support surface 180. A folding nose formation 287 projects above the support surface 180 and also overhangs the gap 175. Alternatively, the upper surface of the nose formation 287 may be at the same level as support surface 180 and the support surface 180 be located at a higher level than base 171 of the well 170.

The pack bodies 122 are pre-cut and scored and so the fold line 16*c* is already defined when a pack body is presented to the insertion station 340. Accordingly wall portions either side of the fold line 16*c* are slightly inclined about the fold line and this assists in passage of the pack body over the nose formation 187. In addition the upper edge of the nose formation 181 is rounded to assist passage of the pack body onto the support surface 180.

Located above the well 170 is a pressing means in the form of a folding foot 191 mounted on a support slide frame 192. The slide frame 192 is slidably mounted on a pair of posts 198 mounted on worktop 180. A piston and cylinder 197 is fixedly supported on a cross-member 196 extending between the posts 198 and the piston rod 195 is connected to the slide frame 192 in order to cause its upward and downward movement. Thus the folding foot 191 is movable toward the base 171 of the well 170 and has a leading bottom edge 193 which co-operates with the folding nose formation 187 to cause partial folding of the pack body about the fold line 16*c* to an intermediate folded position. This situation is illustrated in FIGS. 5 and 7. In these figures the foot 191 is illustrated in its lowermost position whereat the foot 191 presses the pack body against base 171 and holds the partially folded pack body in readiness for insertion of a hook member 50. In this position, the leading bottom edge 193 is located beneath the nose formation 287 resulting in folding of portions 16*b*. As seen in FIG. 5, folding of the wall portions 16*b* to an intermediate position results in opening of the slit 70 to define an aperture 90.

Figure 10:
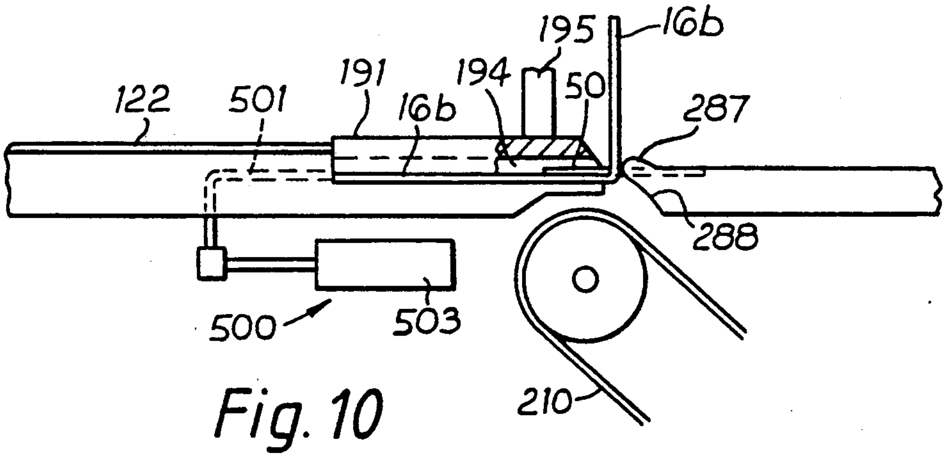
Figure 11:
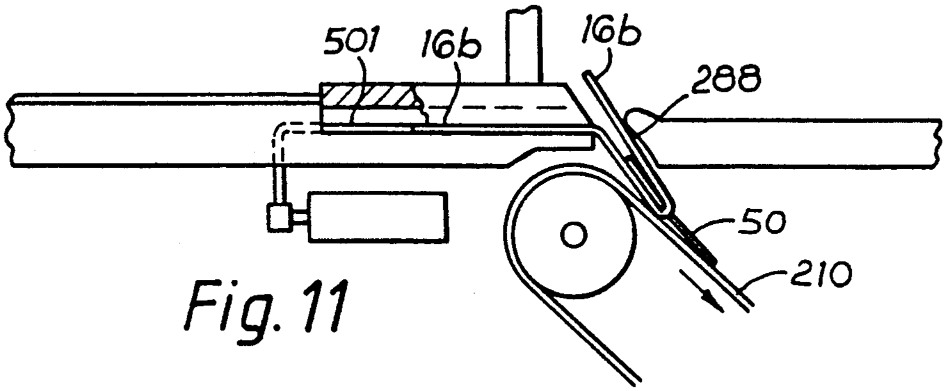

The suspension member feed means 450 includes a piston and cylinder 410 having a piston rod 411 connected to a slide 412. The slide 412 includes a hook member feed head 415 which is located beneath a stack 420 of hook members 50 when the piston rod 411 is in its fully retracted position. The stack 420 of hook members 50 is retained in a column member 421. The feed head 415 includes a recessed seat 416 (FIG. 5) into which the lowermost hook member 50 of the stack 420 sits. The slide 412 is guided in a channel 425 formed in worktop 181 and on extension of the piston rod 411 advances the lowermost hook member 50 toward the insertion station 340. On arrival at the insertion station 340, the hook member 50 passes through an aperture 430 formed in the nose formation 287 to insert the base of the hook member into the pack body aperture 90. The foot 191 is formed with a downwardly facing channel 194 and the base portion 52 passes into channel 194 after it has passed through aperture 90. This situation is illustrated in FIG. 10.

The piston rod 411 is now retracted to position the feed head 415 beneath the stack 420 in readiness for the next insertion stroke. During advancement and retraction of the piston rod 411 the stack of hook members 50 ride on top of the shank of the slide 412.

An ejection means 500 is located beneath the worktop 126 and includes a cranked ejection finger 501 connected to a piston and cylinder assembly 503. The finger 501 is arranged to move along channel 194 and in so doing push the pack body toward the nose formation 287. When the pack body is advanced toward the nose formation 287, the upstanding folded portion 16*b* engages inclined underface 288 of the nose formation which defines a pack body guide surface and is guided downwardly thereby through the gap 175.

The underlying folded portion 16*b* is then gripped by a continuously moving takeaway conveyor belt 210 and is then pulled thereby through the gap 175 and transported away. During its passage through the gap 175 the pack body is completely folded about fold line 16*c*.

The conveyor belt 210 preferably has a surface formation adapted to frictionally grip the pack body 122, for example the surface of the belt may be provided with projecting tooth formations. The take away conveyor belt 210 transports the folded pack body 122 to an opposed conveyor belt 212 and the folded pack is gripped between the opposed runs of the conveyor belts 210,212 and is transported away whilst being gripped in a folded condition to a discharge location. Preferably the opposed runs of conveyor belts 210,212 pass between at least one pair of nip rollers 215 which serve to apply pressure to the folded portions 16*b* of the pack body in order to assist bonding with the glue applied at the glue application station.

Preferably each of the conveyor belts 210,212 is defined by a pair of side by side belts which are spaced apart to enable a folded pack body 122 to be gripped either side of the hook member 50.

We claim:

1. A pack for articles, the pack comprising:

a body formed from a stiff sheet of material adapted to provide support for said articles, the body including a pair of folded wall portions located in face to face contact and joined by a fold; and a suspension member having a planar base portion and a suspension portion extending therefrom;

the base portion being adapted for insertion through a slit formed adjacent the fold so that after insertion the base portion is located adjacent the internal face of at least one of said folded wall portions and the suspension portion extends externally of the folded wall portions to project beyond the fold;

the base portion having an upper end adjacent to the suspension portion and a bottom terminal end which is of narrower width dimension than the upper end;

the upper end being of greater width dimension than the length of said slit; and at least one side of the base portion being defined by an inwardly deflectable resilient tongue which extends along said one side from the bottom end of the base portion toward the suspension portion so that during insertion the tongue is deflected inwardly and that after insertion its terminal end underlies and engages beneath a marginal portion of the fold adjacent to said slit to resist withdrawal of the suspension member from said pair of folded wall portions.

2. A pack according to claim 1 wherein each side of the base portion is defined by an inwardly deflectable tongue which extends from the bottom end of the base portion towards the suspension portion.

3. A pack according to claim 1 or 2 wherein the base portion is provided with a pair of slots each of which define a tongue having an elongate body having a width dimension in excess of its thickness, the slots defining therebetween a central body portion.

4. A pack according to claim 3 wherein opposed sides of each slot are chamfered such that said sides ride over one another in the event of said sides contacting one another when the tongue defined thereby is deflected on insertion.

5. A pack according to claim 3 wherein the central body portion has an upper end having a width approximately equal to the length of the slit.

6. A pack according to claim 3 wherein the bottom end of the base portion is chamfered to facilitate insertion into said slit.

7. A pack according to claim 1 or 2 wherein the suspension member is provided with at least one shoulder which is engageable with said fold to limit insertion of the suspension member into the slit.

8. A pack according to claim 1 wherein the folded wall portions are held in face to face contact by adhesive.

9. A pack according to claim 8 wherein the folded wall portions are held in face to face contact by a line of adhesive which extends across the base portion.

10. A pack according to claim 1 wherein the slit is offset from the fold so as to form an insertion opening on folding of said wall portions about said fold to a position whereat the wall portions are approximately at right angles to one another.

11. A pack for articles, the pack comprising:

a body formed from a stiff sheet of material adapted to provide support for said articles, the body including a pair of folded wall portions located in face to face contact and joined by a fold having a slit adjacent thereto; and a planar suspension member extending through said slit and having a planar base portion located in between said pair of folded wall portions and a suspension portion extending therefrom to project beyond said fold;

the base portion having an upper end adjacent to the suspension portion and a bottom terminal end which is of narrower width dimension than the the upper end, the upper end being of greater width dimension than the length of said slit;

each side of the base portion being defined by an inwardly deflectable resilient tongue having a width dimension in excess of its thickness and which extends along said one side from the bottom end of the base portion toward the suspension portion so that during insertion each tongue is able to deflect inwardly.

the terminal end of each tongue being positioned to underlie and thereby engage beneath a marginal portion of the fold adjacent to said slit to resist withdrawal of the suspension member from said pair of folded wall portions;

the base portion being provided with a pair of slots each of which define one of said tongues, the slots defining therebetween a central body portion having an upper end having a width approximately equal to the length of the slit; and the slit being offset from the fold so as to form an insertion opening on folding of said wall portions about said fold to a position whereat the wall portions are approximately at right angles to one another.

* * * * *